United States Patent [19]

Hargrave

[11] Patent Number: 5,225,864
[45] Date of Patent: Jul. 6, 1993

[54] CAMERA EXPOSURE CONTROL
[75] Inventor: Jerry L. Hargrave, Rochester, N.Y.
[73] Assignee: Eastman Kodak Company, Rochester, N.Y.
[21] Appl. No.: 826,582
[22] Filed: Jan. 27, 1992
[51] Int. Cl.[5] .............................................. G03B 17/00
[52] U.S. Cl. ................................... 354/273; 354/289.1
[58] Field of Search ............ 354/270, 273, 288, 289.1, 354/289.11, 219-225, 289.12

[56] References Cited

U.S. PATENT DOCUMENTS

| | | | |
|---|---|---|---|
| 1,512,785 | 10/1924 | Mittasch | 354/270 |
| 2,015,261 | 9/1935 | Eckler | 354/270 |
| 2,380,216 | 7/1945 | Carter | 354/270 |
| 3,651,748 | 3/1972 | Yoshiada | 354/270 X |
| 3,906,526 | 9/1975 | Toyoshima et al. | 354/149 |

Primary Examiner—Michael L. Gellner
Assistant Examiner—Howard B. Blankenship
Attorney, Agent, or Firm—Roger A. Fields

[57] ABSTRACT

A photographic camera comprises a camera housing with a viewfinder having a defined field of view, a hollow lens snout projecting from the camera housing forward of the viewfinder, a taking lens supported substantially at a front end of the lens snout, and exposure control means. The exposure control means is a single-piece part with a warning flag supported to be moved manually through a slit in the lens snout adjacent the forward end of the lens snout, between a non-operative position hidden inside the lens snout to prevent the warning flag from being seen in the field of view of the viewfinder and an operative position outside the lens snout to make the warning flag visible in the field of view of the viewfinder, and with a circular hole arranged relative to the warning flag to be located behind the taking lens to reduce the size of a lens apertue, when the warning flag is in its non-operative position, and to be located out from behind the taking lens to restore the size of the lens aperture, when the warning flag is in its operative position.

4 Claims, 6 Drawing Sheets

FIG. I

CAMERA EXPOSURE CONTROL

CROSS REFERENCE TO A RELATED APPLICATION

Reference is made to commonly assigned copending application Ser. No. 07/826,584 entitled VIEW-FINDER MAGNIFIER and filed Jan. 27, 1992 in the names of James D. Boyd and Jerry L. Hargrave.

BACKGROUND OF THE INVENTION

1. Field of the Invention

The invention relates generally to the field of photography, and in particular to a camera exposure control.

2. Description of the Prior Art

Often in simple non-automatic cameras, various exposure-related settings can be manually selected for different light levels. These settings typically affect the camera's shutter speed or lens aperture. Since a selected setting is intended only for picture-taking in certain lighting conditions, such as sunny to partly cloudy as contrasted to overcast or indoors, a warning indicator is placed within the camera's viewfinder to alert the photographer as to the existing setting. Thus, the photographer will be reminded to change the existing setting to another one in accordance with a change in the lighting condition.

Characteristically, the exposure control means for changing the camera's shutter speed or lens aperture are separate from the warning indicator. For example, the warning indicator may be a light-emitting diode in the viewfinder and the exposure control means may be a plate with a circular hole in it for changing the lens aperture.

SUMMARY OF THE INVENTION

According to one aspect of the invention there is provided a photographic camera comprising a camera housing with a viewfinder having a defined field of view, a hollow lens snout projecting from the camera housing forward of the viewfinder, a taking lens supported substantially at a front end of the lens snout, and exposure-related indicating means visible in the field of view of the viewfinder, which is characterized in that:

said indicating means includes a warning flag supported for movement through a slit in the lens snout, between a non-operative position hidden inside the lens snout to prevent the warning flag from being seen in the field of view of the viewfinder and an operative position outside the lens snout to make the warning flag visible in the field of view of the viewfinder.

According to another aspect of the invention there is provided a photographic camera comprising a camera housing with a viewfinder having a defined field of view, a hollow lens snout projecting from the camera housing forward of the viewfinder, a taking lens supported substantially at a front end of the lens snout, and exposure control means, which is characterized in that:

said exposure control means is a single-piece part with a warning flag supported to be moved manually through a slit in the lens snout adjacent the forward end of the lens snout, between a non-operative position hidden inside the lens snout to prevent the warning flag from being seen in the field of view of the viewfinder and an operative position outside the lens snout to make the warning flag visible in the field of view of the viewfinder, and with a circular hole arranged relative to the warning flag to be located behind the taking lens to reduce the size of a lens aperature, when the warning flag is in its non-operative position, and to be located out from behind the taking lens to restore the size of said lens aperture, when the warning flag is in its operative position.

DETAILED DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
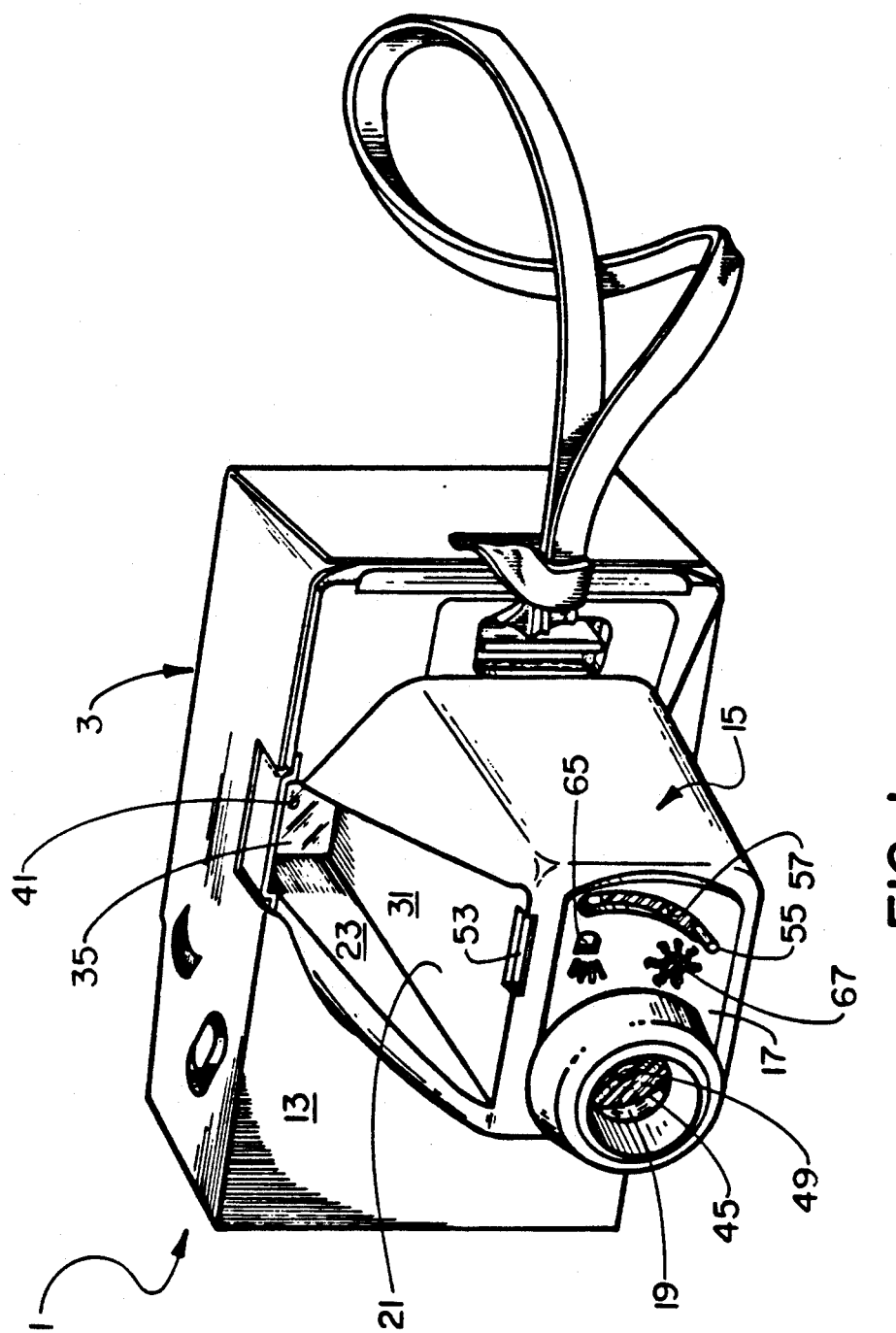
FIG. 1 is a front perspective view of a photographic camera including an exposure control device according to a preferred embodiment of the invention.
Figure 3:
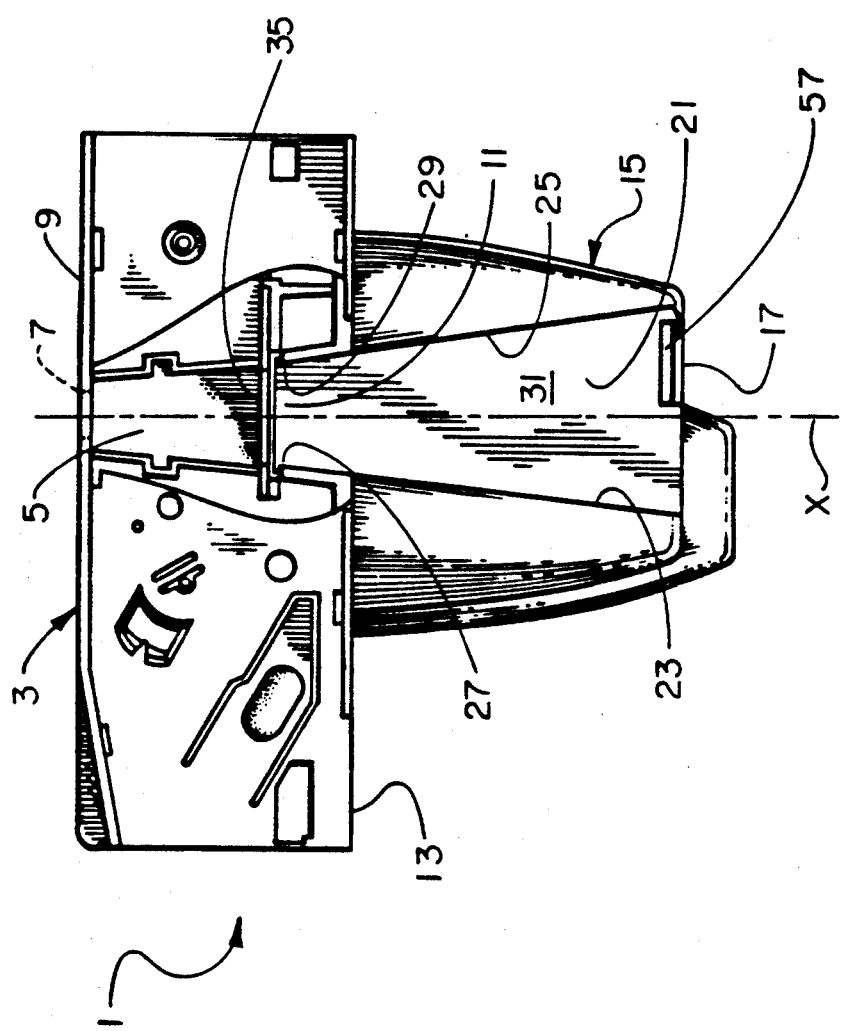
FIG. 3 is a top view of the photographic camera with part of its top cover removed to show the camera viewfinder.

Referring now to FIGS. 1 and 3 of the drawings there is shown a photographic camera 1 comprising a camera housing or body 3 which has an internal viewfinder tunnel 5 bounded by a viewing opening 7 in a rear wall 9 of the housing and a frame finder opening 11 in a front wall 13 of the housing. A hollow taking lens extension or snout 15 projects longitudinally from the front wall 13 and has a front end or panel 17 that supports a lens element 19. Typically, when aiming the photographic camera 1 at a subject to be photographed, one places an eye at the viewing opening 7, looks through the internal viewfinder tunnel 5, and out the frame finder opening 11.

Figure 2:
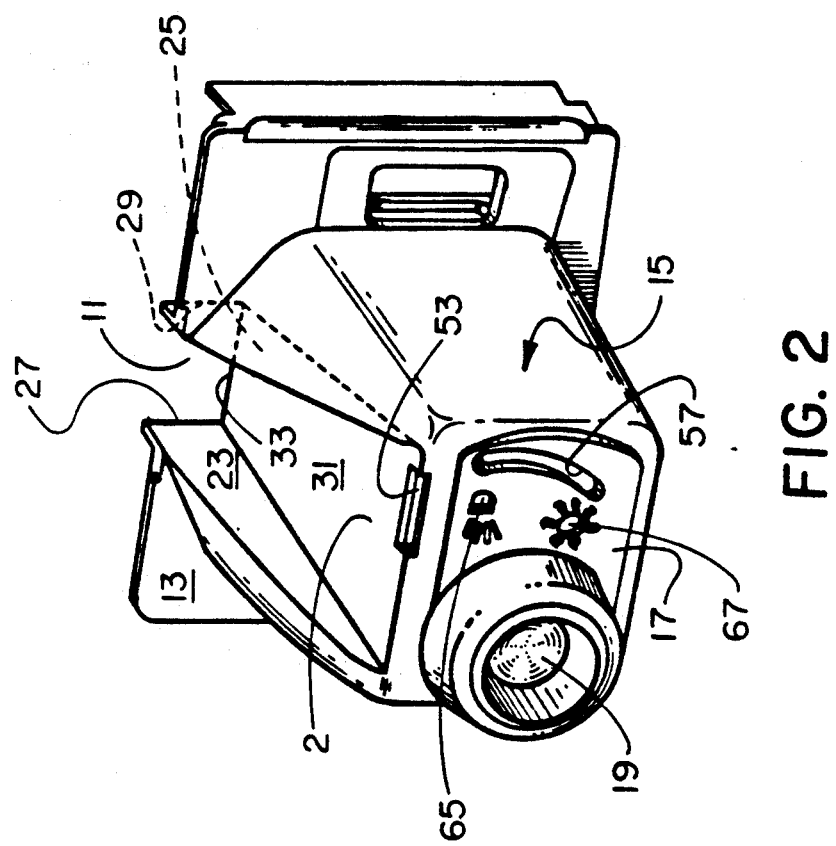
FIG. 2 is a front perspective view of an integral front wall and taking lens extension of the camera housing.

The taking lens extension 15 has a channel-like cut-out 21 substantially along its length which converges toward the frame finder opening 11 to effectively extend the viewfinder tunnel 5 to facilitate camera aiming. See FIGS. 1 and 3. The channel-like cut-out 21 is defined by a pair of upstanding spaced walls 23 and 25 of the taking lens extension 15 which converge from the front end 17 of the taking lens extension rearwardly to respective sides 27 and 29 of the frame finder opening 11. See FIG. 2. Also, the channel-like cut-out 21 is defined by a floor 31 which extends between the spaced walls 23 and 25 from the front end 17 of the taking lens extension rearwardly to a bottom 33 of the frame finder opening 11. The bottom 33 of the frame finder opening 11 lies between the two sides 27 and 29 of the frame finder opening. See FIG. 2.

A light reducing semi-transparent filter or window, such as a neutral density filter 35, is fixed across the frame finder opening 11 to make the subject to be photographed appear faint or obscured when one views it through the viewfinder tunnel 5 in ambient light that is insufficient for a proper daylight exposure. See FIGS. 1 and 3. Specifically, if one can see details of the subject, there is enough light to take an acceptable picture. Conversely, if one cannot see details of the subject, the light level is too low to take a good picture. In one example, there was selected a film speed of ISO 1600, an 85 mm taking lens, an exposure aperture of f/11, and an exposure time of 1/125 second. Given an underexposure latitude of two f/stops, unacceptable pictures are expected to occur at ambient light of 12 or lower foot-lamberts. Subjective testing then led to a neutral density filter 35 with a 1.6 to 1.8 log density.

The neutral density filter or window 35 has a central portion 37 substantially at a viewing axis X of the viewfinder tunnel 5 with little or no light reducing capability as compared to a main or surrounding portion 39 of the filter. See FIGS. 4 and 5. This permits the subject to be viewed through the central portion 37 more readily than it can be viewed through the main or surrounding portion 39. As a result, the central portion 37 can be used as a pointing or aiming device to aim at the subject when looking through the viewfinder tunnel 5. Preferably, the central portion 37 is a round viewing hole 41 in the filter 35. Alternatively, the central portion 37 can be less thick or less dense than the main or surrounding portion 39. What is necessary to make a pointing or aiming device is that a central "bright spot" be apparent in the viewfinder tunnel 5 when looking at the subject. Also, it has been determined that the central "bright spot" can serve as a good base or reference standard for the camera user to judge if the subject appears faint when viewed through the main or surrounding portion 39. In place of the round viewing hole 41, other shapes may be employed as the aiming device. These include cross-hair designs, rectangular-line designs, etc.

The neutral density filter or window 35 has a peripheral portion 43 with little (or no) light reducing capability, i.e. less thick or less dense, as compared to the main or surrounding portion 39 of the filter. See FIGS. 4 and 5. This permits the subject to be viewed through the peripheral portion 43 more readily than it can be viewed through the main or surrounding portion 39. Consequently, the peripheral portion 43 can be used to frame the subject.

Figure 6:
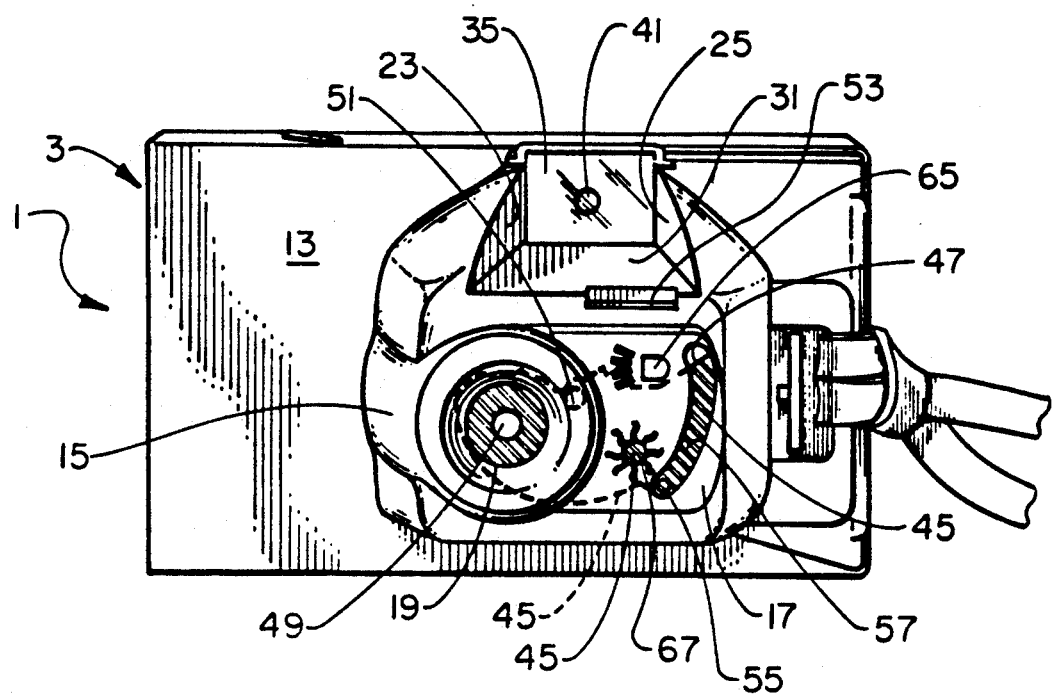
FIGS. 6 and 7 are front and rear elevation views of the exposure control device including a single-piece aperture plate and warning flag behind a front face of the camera housing, showing the aperture plate and warning flag in position for picture-taking in sunny to partly cloudy lighting conditions.
Figure 7:
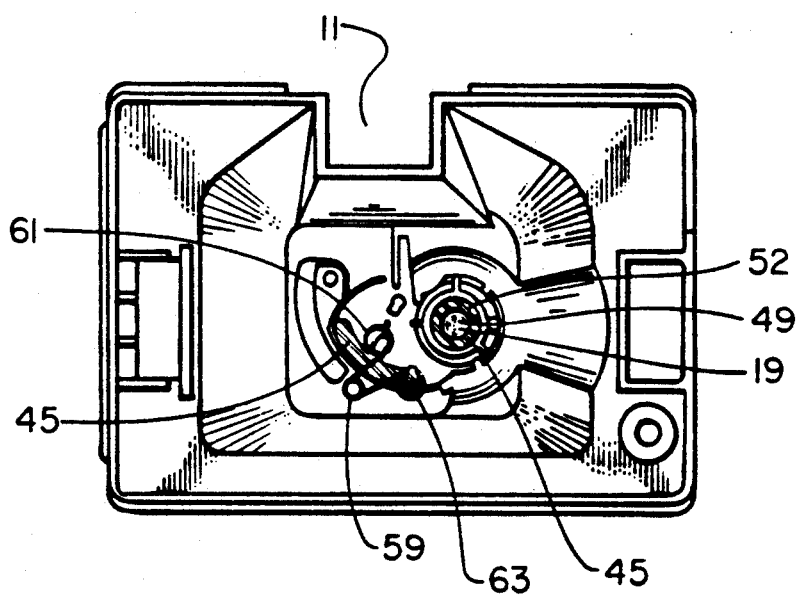
Figure 8:
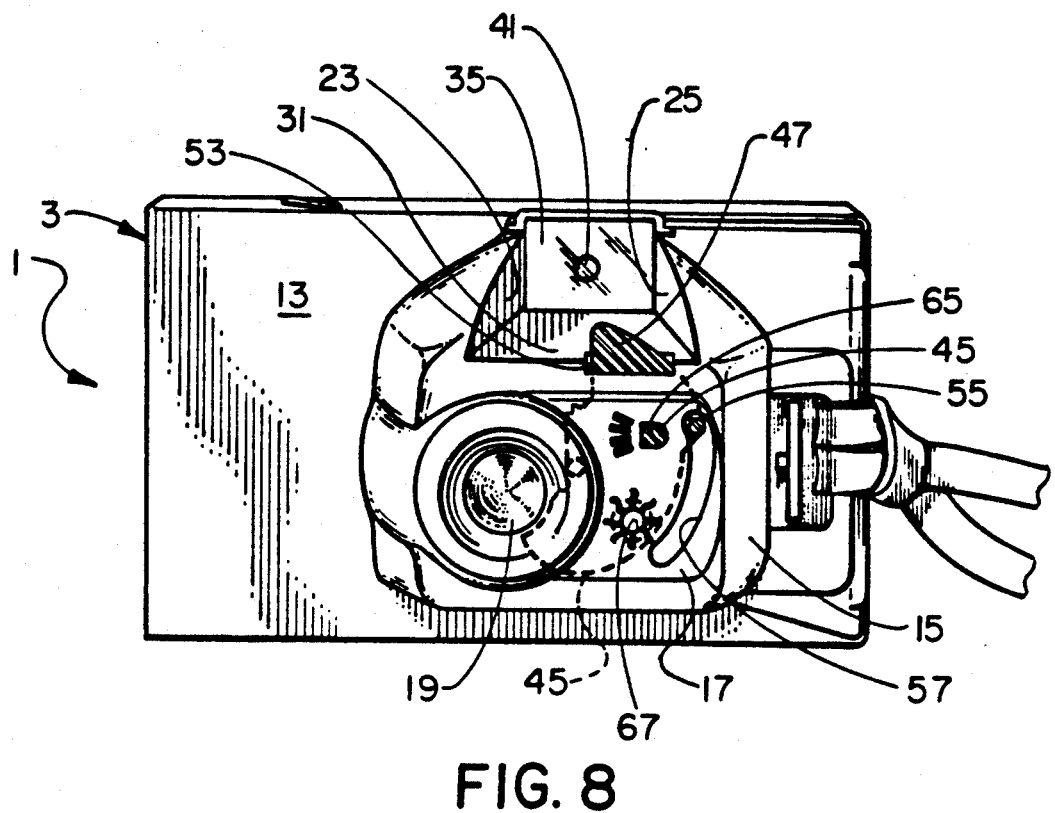
FIGS. 8 and 9 are front and rear elevation views of the single-piece aperture plate and warning flag in position for picture-taking in overcast or indoor/outdoor bright flood-light lighting conditions.
Figure 9:
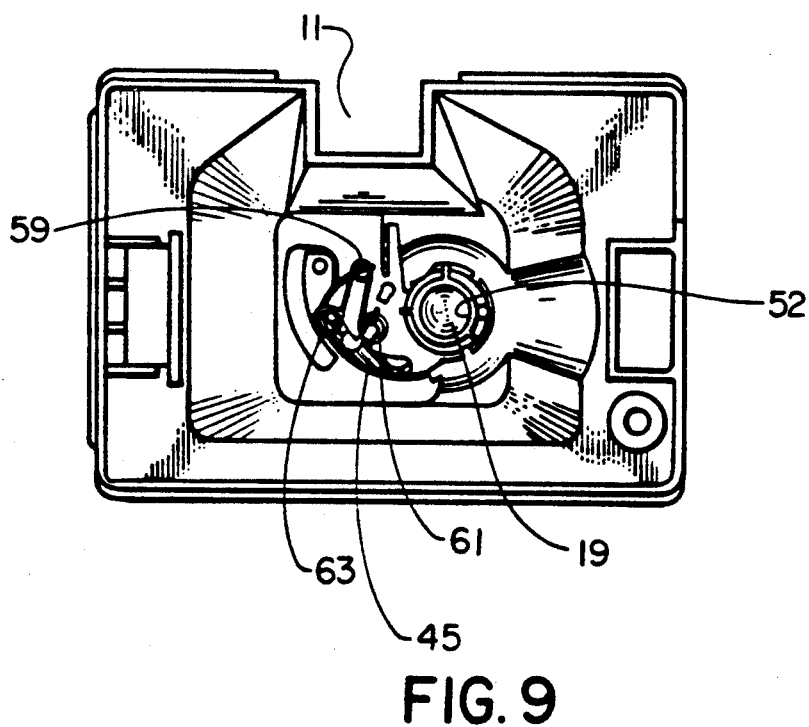

According to the invention, a single-piece part 45 has a warning flag 47 and a circular hole 49. The single-piece part 45 is supported for pivotal movement about a post 51 inside the taking lens extension 15 between respective positions shown in FIGS. 6 and 8. FIG. 6 shows the single-piece part 45 with its warning flag 47 hidden inside the taking lens extension 15, and with its circular hole 49 behind the lens element 19 to reduce the lens aperture 52 from f/11 to f/22. This position of the single-piece part 45 is manually selected for picture-taking in sunny to partly cloudy lighting conditions. FIG. 8 shows the single-piece part 45 with its warning flag 47 protruding from a slit 53 in the taking lens extension 15 adjacent the front end 17 of the lens extension to be visible when looking at the subject through the viewfinder tunnel 15, and with its circular hole 49 out from behind the lens element 19 to restore the lens aperture 52 to f/11. This position of the single-piece part 45 is manually selected for picture-taking in overcast or indoor/outdoor bright flood-light lighting conditions. A handle 55 integrally formed with the single-piece part 45 protrudes from an arcuate slot 57 in the front end 17 of the taking lens extension 15 to enable one to pivot the single-piece part about the post 51 between its respective positions shown in FIGS. 6 and 8. An overcenter spring 59 is connected at one end 61 to the single-piece part 45 and at another end 63 to the taking lens extension 15 to urge the single-piece part as shown in FIG. 7 to its position in FIG. 6 and as shown in FIG. 9 to its position in FIG. 8. The overcenter spring 59 insures that the single-piece part 45 is returned to either one of its two positions should one leave it intermediate those positions.

When the warning flag 47 protrudes from the slit 53 in the taking lens extension 15 as shown in FIG. 8, it serves as a reminder that the single-piece part 45 is set for picture-taking in overcast or indoor/outdoor bright flood-light lighting conditions rather than sunny to partly cloudy lighting conditions. A further similar reminder is provided at the front end 17 of the taking lens extension by the symbolled opening 65 in the front end. As shown in FIG. 8, the single-piece part 45 is visible through the symbolled opening 65 but not through a symbolled opening 67 in the front end 17 when the warning flag 47 protrudes from the slit 53. Conversely, when the warning flag 47 is hidden inside the taking lens extension 15 as shown in FIG. 6, the single-piece part 45 is visible through the symbolled opening 67 but not through the symbolled opening 65 to serve as a reminder that the single-piece part is set for picture-taking in sunny to partly cloudy lighting conditions rather than overcast or indoor/outdoor bright flood-light lighting conditions.

Figure 4:
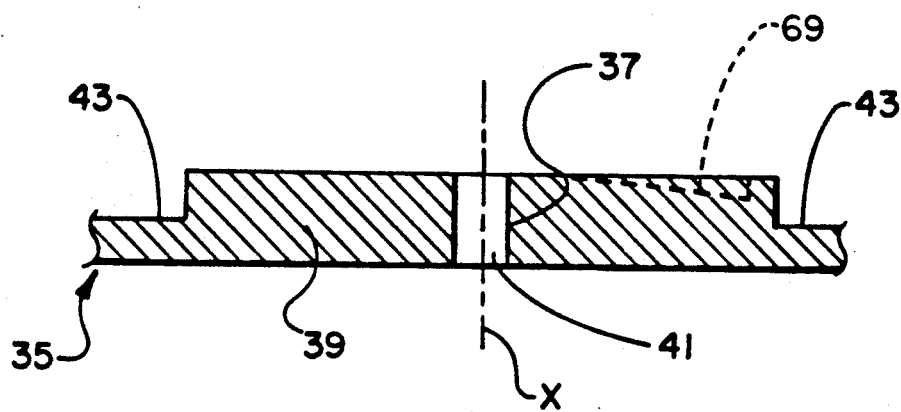
FIG. 4 is a cross-section view of a neutral density filter included in the viewfinder.
Figure 5:
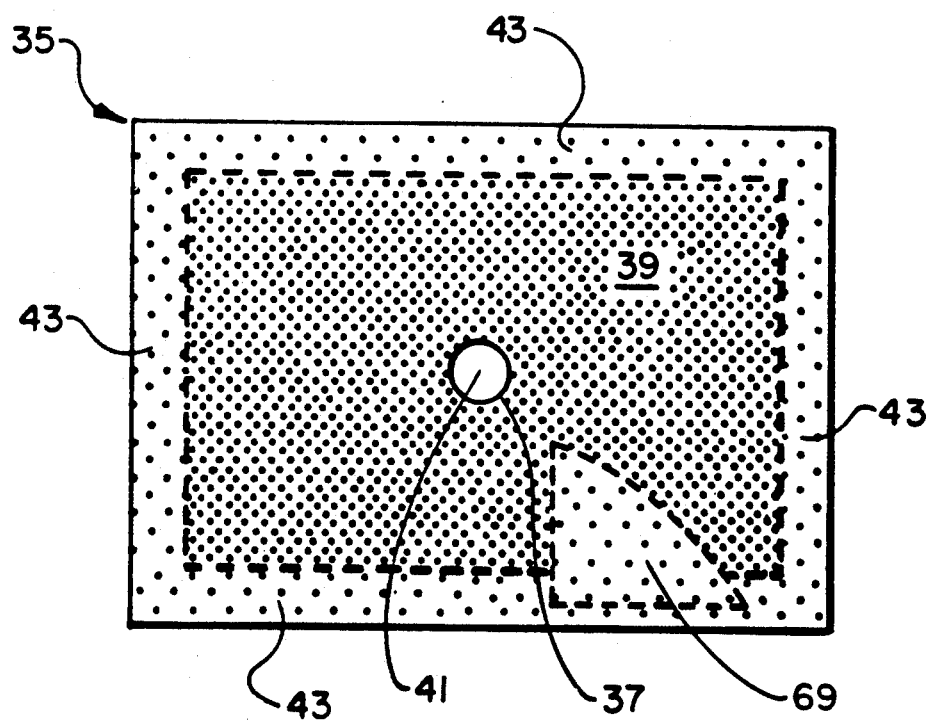
FIG. 5 is a front elevation view of the neutral density filter.

As shown in FIGS. 4 and 5, the neutral density filter or window 35 has an integrally formed magnifier lens 69 for placing the warning flag 47 in focus when the warning flag protrudes from the slit 53 in the front end 17 of the taking lens extension 15 and one views the subject through the viewfinder tunnel 5. The magnifier lens 69 is very small in comparison to the dimensions of the filter or window 35 to not substantially distort the view of the subject. Also, it is located substantially adjacent one corner of the filter or window 35 to not block the view of the subject. Other details of the magnifier lens 69 are disclosed in cross-referenced application Ser. No. 07/826,584.

The invention has been described with reference to a preferred embodiment. However, it will be appreciated that variations and modifications can be effected within the ordinary skill in the art without departing from the scope of the invention.

I claim:

1. A photographic camera comprising a camera housing with a viewfinder having a defined field of view, a hollow lens snout projecting from said camera housing forward of said viewfinder, a taking lens supported substantially at a front end of said lens snout, and exposure-related indicating means visible in the field of view of said viewfinder, is characterized in that:

said indicating means includes a warning flag supported for movement through a slit in said lens snout, between a non-operative position hidden inside the lens snout to prevent said warning flag from being seen in the field of view of said viewfinder and an operative position outside the lens snout to make the warning flag visible in the field of view of the viewfinder.

2. A photographic camera comprising a camera housing with a viewfinder having a defined field of view, a hollow lens snout projecting from said camera housing forward of said viewfinder, a taking lens supported substantially at a front end of said lens snout, and exposure control means, is characterized in that:

said exposure control means is a single-piece part with a warning flag supported to be moved manually through a slit in said lens snout adjacent said forward end of the lens snout, between a non-operative position hidden inside the lens snout to prevent said warning flag from being seen in the field of view of said viewfinder and an operative position outside the lens snout to make the warning flag visible in the field of view of the viewfinder, and with a circular hole arranged relative to the warning flag to be located behind said taking lens to reduce the size of a lens aperture, when the warning flag is in its non-operative position, and to be located out from behind the taking lens to restore the size of said lens aperture, when the warning flag is in its operative position.

3. A photographic camera as recited in claim 2, characterized further in that:

an overcenter spring is connected to said lens snout and said single-piece part to urge said warning flag to either one of its non-operative and operative positions should the warning flag be left intermediate those two positions.

4. A photographic camera comprising a camera housing with a viewfinder having a defined field of view, a hollow lens snout projecting from said camera housing forward of said viewfinder, a taking lens supported substantially at a front end of said lens snout, and exposure-related indicating means visible in the field of view of said viewfinder, is characterized in that:

said indicating means includes a warning flag supported to be moved manually through a slit in said lens snout, between a non-operative position hidden inside the lens snout to prevent said warning flag from being seen in the field of view of said viewfinder and an operative position outside the lens snout to make the warning flag visible in the field of view of the viewfinder; and an overcenter spring is connected to said lens snout and said warning flag to urge the warning flag to either one of its non-operative and operative positions should the warning flag be left intermediate those two positions.

* * * * *